United States Patent [19]
Creed et al.

[11] Patent Number: 5,786,014
[45] Date of Patent: Jul. 28, 1998

[54] CAPACITY CAUSTIC PEELER SYSTEM

[75] Inventors: Sherman Howell Creed; Jeffrey Alan Dahl; Robert Leland Frenkel, all of Fresno; Thomas Milton Sams, Oakdale, all of Calif.

[73] Assignee: FMC Corporation, Chicago, Ill.

[21] Appl. No.: 837,068

[22] Filed: Apr. 11, 1997

[51] Int. Cl.[6] .................. A23N 7/00; A23N 7/02; A23N 7/10
[52] U.S. Cl. .................. 426/287; 99/516; 99/584; 99/534; 99/623; 99/630; 426/442; 426/482
[58] Field of Search .................. 99/516, 534–536, 99/404–406, 538–541, 584, 588, 623–630; 426/287, 288, 442, 479–483; 83/651.1

[56] References Cited

U.S. PATENT DOCUMENTS

| | | | |
|---|---|---|---|
| 3,396,769 | 8/1968 | Hirahara | 146/231 |
| 3,602,282 | 8/1971 | Hirahara | 426/287 |
| 3,854,395 | 12/1974 | Hirahara | 99/630 |
| 4,023,477 | 5/1977 | Hirahara et al. | 99/585 |
| 4,062,985 | 12/1977 | Amstad | 426/483 |
| 4,132,162 | 1/1979 | Magnuson | 99/516 X |
| 4,230,034 | 10/1980 | Amstad | 99/587 |
| 4,237,782 | 12/1980 | Bichel | 99/625 |
| 4,519,305 | 5/1985 | Vanosdall | 99/625 |
| 4,831,922 | 5/1989 | Cogan et al. | 99/486 |
| 4,842,883 | 6/1989 | Amstad | 426/483 |
| 5,033,372 | 7/1991 | Silvestrini | 99/625 |
| 5,106,641 | 4/1992 | Bichel | 99/516 X |
| 5,351,610 | 10/1994 | Jonsson | 99/623 X |

OTHER PUBLICATIONS

*FMC SP 20 Steam Peeler System*, ©1991 By FMC Corporation, 6 pages.
*FMC Tomato Peeler, Model CA–20*, ©1978 By FMC Corporation, 2 pages.

*Primary Examiner*—Timothy F. Simone
*Attorney, Agent, or Firm*—Ronald C. Kamp

[57] ABSTRACT

An improved higher capacity caustic peeler of fruits such as tomatoes. The peeler subjects the tomatoes to a caustic applicator with shallower buckets with apertures in the buckets and a higher number of caustic dispensing jets, and then provides peeling using a flexible cable cage, which tumbles the tomatoes. A pinch roller is used to remove the remainder of the peels (or skins).

13 Claims, 6 Drawing Sheets

5,786,014

CAPACITY CAUSTIC PEELER SYSTEM

In caustic peeler systems, fruits such as tomatoes are subjected to a caustic substance, such as lye, which softens the skin. The tomatoes are then subjected to a scrubber to remove the skins and pectinous material from the tomatoes.

In the prior art, buckets that held the fruit in caustic peeler systems were so deep, that such system had a low capacity.

It is an object of the invention to provide a caustic peeler and scrubber which is able to handle a higher capacity of fruits, such as tomatoes.

The invention improves the capacity of the caustic peeler system, by making the trapezoid buckets shallower and by increasing the flow of heated caustic solution and then passing fruits through a flexible cable peeler system.

Figure 1:
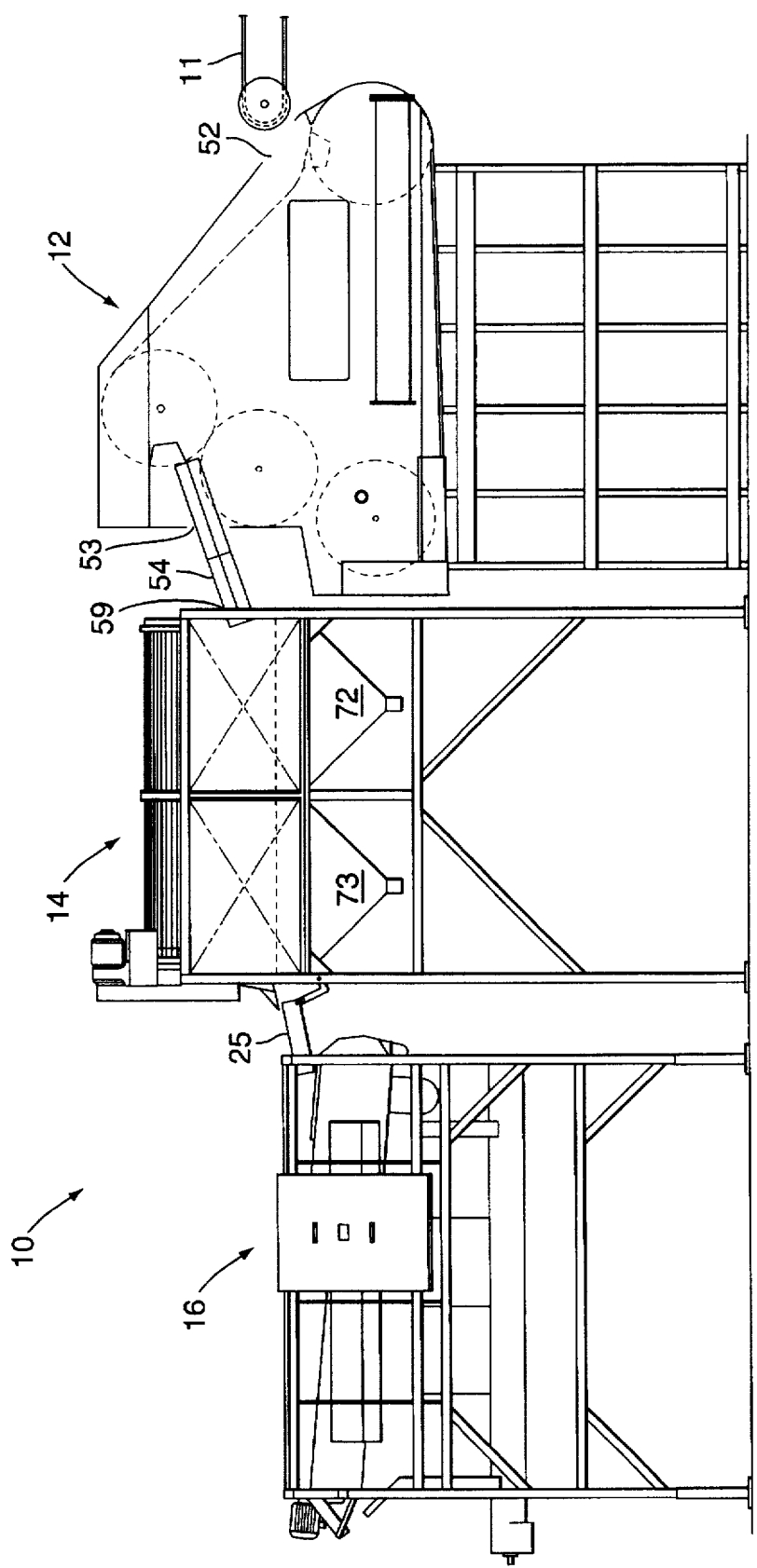
FIG. 1 is a schematic view of an improved caustic fruit peeler system.

The caustic fruit peeler system 10 shown in FIG. 1, comprises a feed conveyor 11, a caustic applicator 12, a flexible cable peeler 14, and a pinch roller assembly 16. The feed conveyor 11 comprises an endless conveyor belt.

Figure 2:
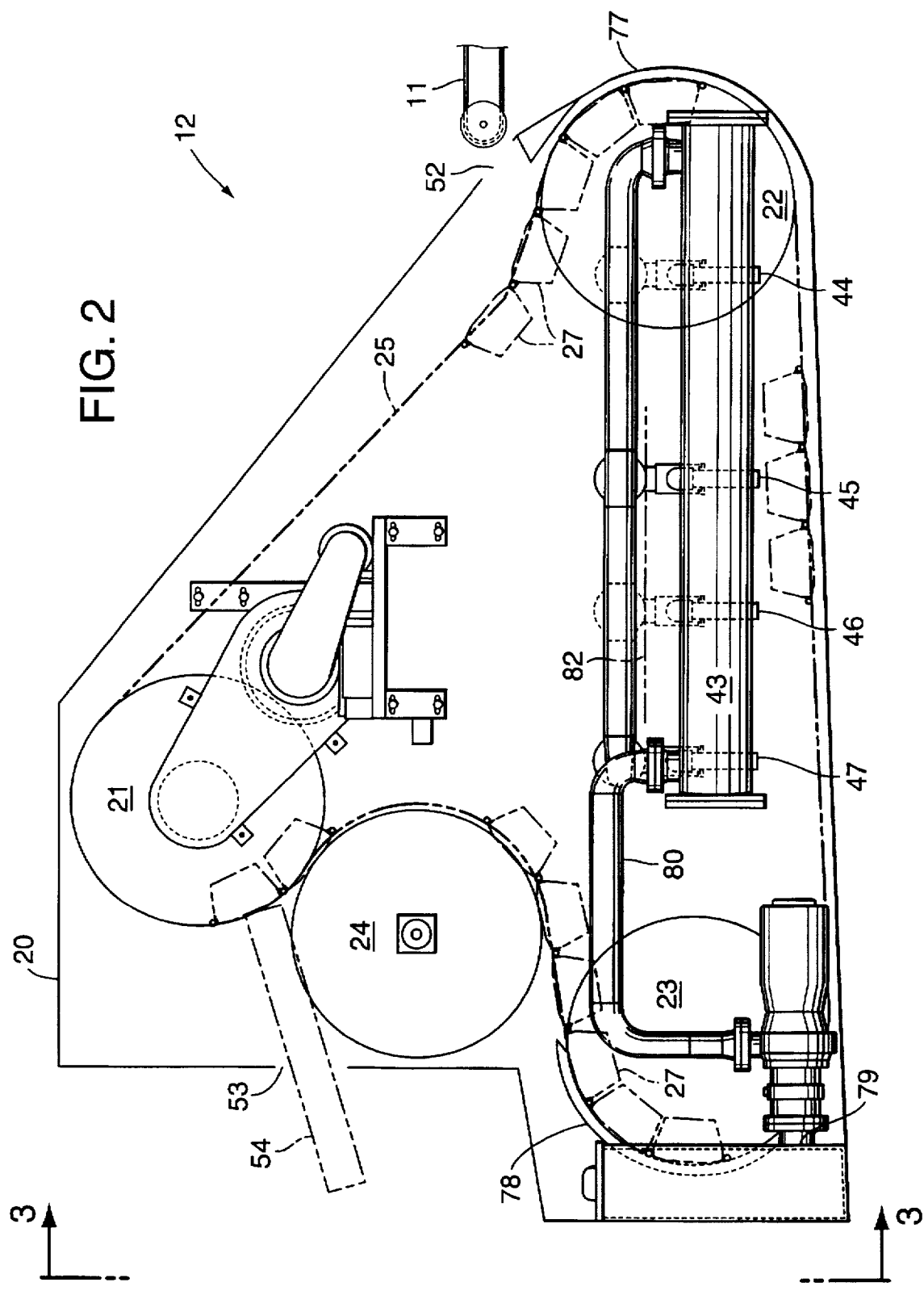
FIG. 2 is side view of a caustic applicator used in the improved caustic peeler system of FIG. 1.
Figure 3:
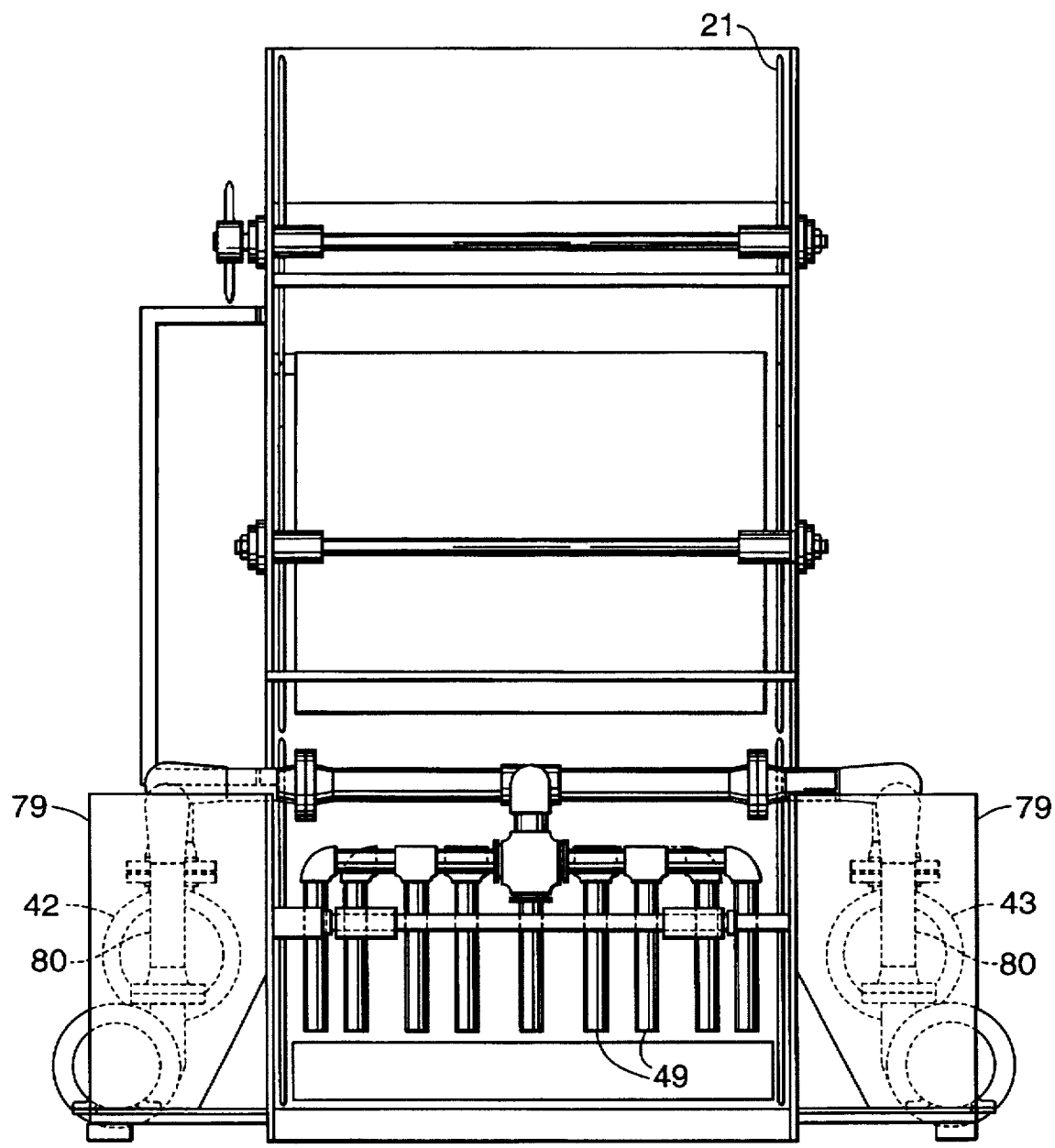
FIG. 3 is an end view of the caustic applicator shown in FIG. 2 along line 3—3.

FIG. 2 is an enlarged side view of the caustic applicator 12. The applicator 12 comprises a housing 20, a drive pulley 21, a first pulley 22, a second pulley 23, a third pulley 24, and an endless conveyor 25, surrounding the drive wheel 21, the first pulley 22, and the second pulley 23. A plurality of buckets 27 form part of the endless conveyor 25. FIG. 3 is an end view of the caustic applicator 12, shown in FIG. 2 along line 3—3 with part of the housing 20 and the endless conveyor 25 and the pulleys removed.

Figure 4:
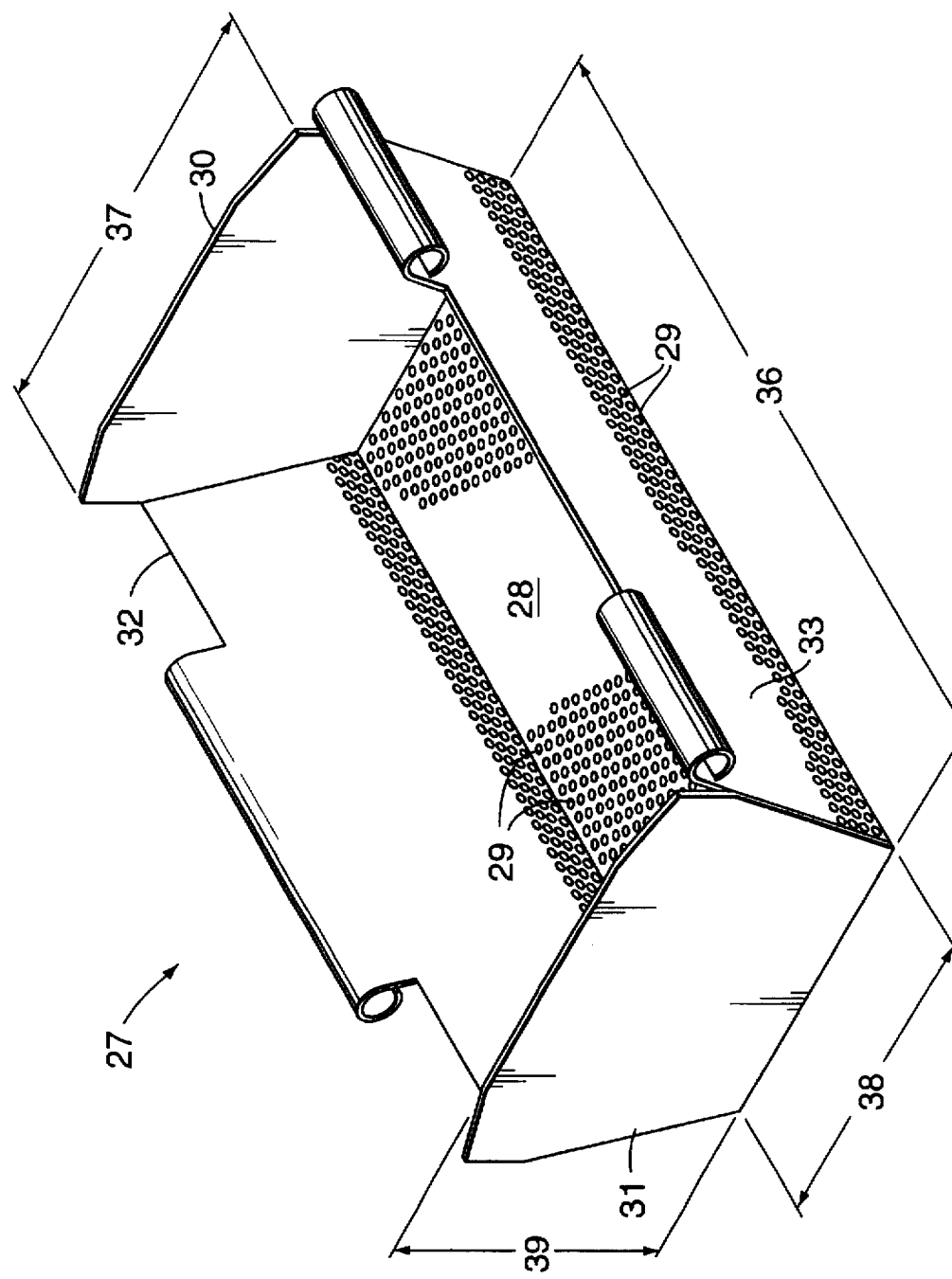
FIG. 4 is a perspective view of a bucket used in the caustic applicator shown in FIG. 2.

FIG. 4 is a perspective cut away view of a bucket 27. Each bucket 27 has a bottom 28, a first end wall 30, a second end wall 31, a first side wall 32, and a second side wall 33. The bottom 28, first side wall 32, and second side wall 33 are rectangular. The first end wall 30 and the second end wall 31 are trapezoidal. A plurality of apertures 29 pass through the bottom 28 and the bottom part of the first side wall 32 and the second side wall 33. In the preferred embodiment, the length 36 of each bucket 27 extends across the width of the endless conveyor 25. The widest part of the width 37 of the each bucket 27 is between 10 and 12 inches. The narrowest part of the width 38 of each bucket is between 7 and 8 inches. The depth 39 of each bucket 27 measured from the pivot point is between 5 and 6 inches. In the prior art such buckets were greater than 10 inches in depth. The diameter of each aperture 29 is preferably 7/16 of an inch. The diameter of the apertures 29 may be in the range between 0.25 inches and 0.75 inches. In the prior art, such apertures were 5/64 of an inch. The buckets 27 form the endless conveyor 25 so that the bottoms 28 are towards the interior of the endless conveyor 25. A first sleeve 77 is placed adjacent to the first pulley 22. A second sleeve 78 is placed adjacent to the second pulley 23. The first sleeve 77 and the second sleeve 78 may be formed from part of the housing 20. In the preferred embodiment, the second sleeve 78 and second pulley 23 are pivotably mounted for tensioning the endless conveyor 25.

The caustic applicator 12 also comprises a caustic fluid dispensing system. The caustic fluid dispensing system comprises a first heat exchanger 42, a second heat exchanger 43, a first row of dispensing jets 44, a second row of dispensing jets 45, a third row of dispensing jets 46, and a fourth row of dispensing jets 47. Each row of dispensing jets has a plurality of dispensing jets 49. In this embodiment the first heat exchanger 42 is in fluid connection with the first row of dispensing jets 44 and the third row of dispensing jets 46, which each have four dispensing jets. The second heat exchanger 43 is in fluid connection with the second row of dispensing jets 45 and the fourth row of dispensing jets 47 which each have five dispensing jets. The difference in the number of dispensing jets between the rows of dispensing jets, allows for a staggered placement of the dispensing jets.

The housing 20 of the caustic applicator 12 has an inlet 52 and an outlet 53. An applicator chute 54 extends from the outlet 53 of the caustic applicator 12 to an inlet 59 of the flexible cord peeler 14, as shown in FIG. 1.

Figure 5:
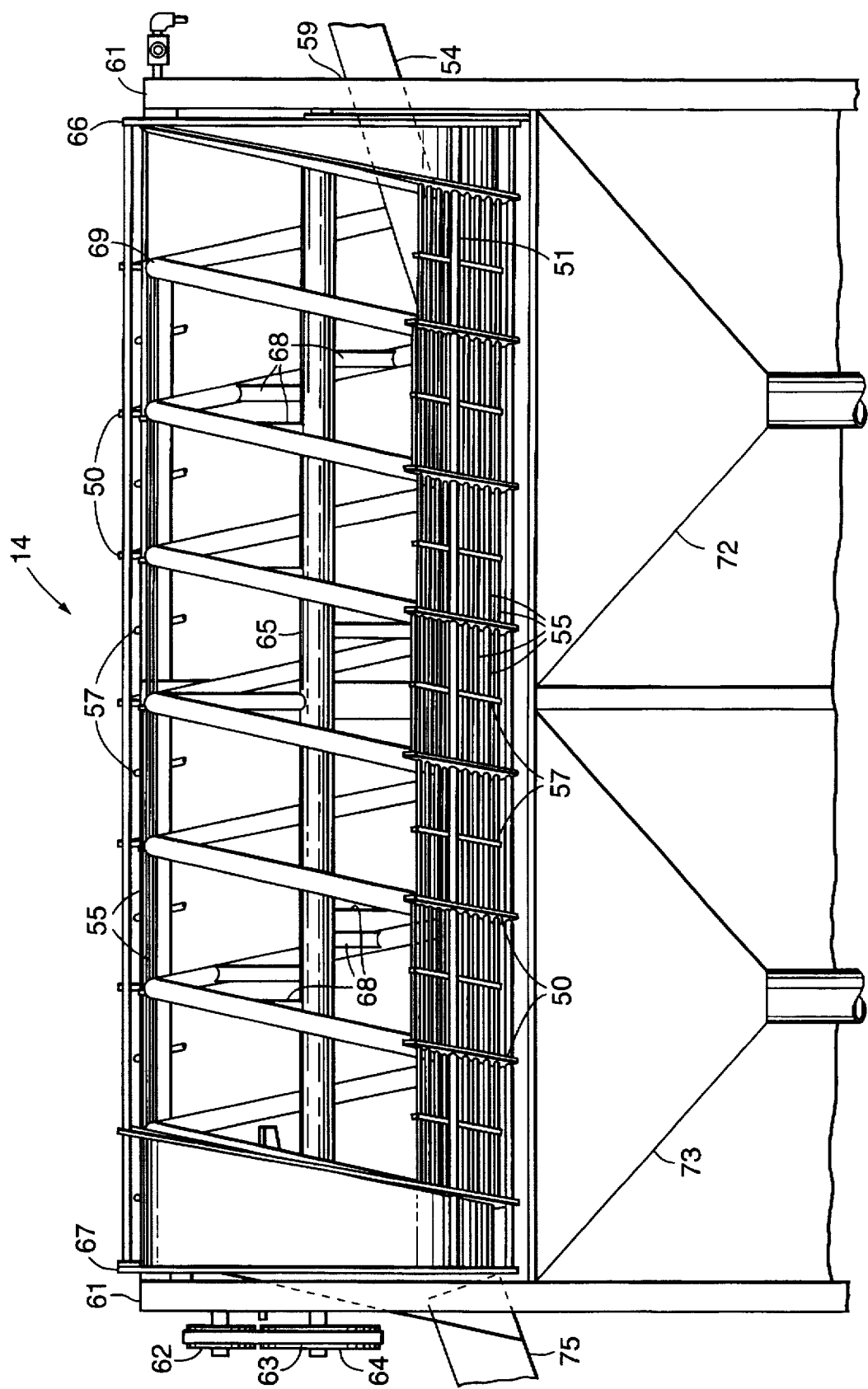
FIG. 5 is a cut away side view of a flexible cable peeler, used in the invention.

The flexible cable peeler 14 is similar to a peeler described in U.S. Pat. No. 4,023,477. FIG. 5 is a cut away side view of the flexible cable peeler 14. A support frame 61 supports the flexible cable peeler 14. A drive mechanism 62 is supported by the support frame 61. A drive belt 63 is connected between the drive mechanism 62 and a drive shaft pulley 64. A drive shaft 65 is journaled within the support frame 61 and is mechanically connected to the drive shaft pulley 64. A plurality of longitudinally extending spokes 68 extend radially from the drive shaft 65, with the first ends of the longitudinally extending spokes 68 mechanically connected to the drive shaft 65. A first end ring 66 is located at a first end of the drive shaft 65 inside of the support frame 61 and is supported by the second ends of some of longitudinally extending spokes 68. A second end ring 67 is located at a second end of the drive shaft 65 inside of the support frame 61 and is supported by the second ends of some of longitudinally extending spokes 68. A helically wound continuous tube 69 extends from the first end ring 66 to the second end ring 67 winding around the drive shaft 65 and supported by the second ends of some of the longitudinally extending spokes 68. A flat, continuous helical flange 50, is welded to, and projects from the central outer surface of the helically wound continuous tube 69. Tie rods 51 parallel to the drive shaft 65 pass through the helical flange 50 and are mechanically connected to the helical flange 50 by welding and strengthen the helical flange 50. A plurality of elastic peeling cords 55 extend from one part of the helical flange 50 to another part of the helical flange 50 parallel to the drive shaft 65, with the elastic peeling cords 55 passing through apertures in the helical flange 50 and held in place in tension with peeling cord caps. The elastic peeling cords 55 are molded of neoprene or a similar rubber-like material which can be stretched to about 1 ½ times its length and will rebound to its initial length rapidly and with force. The peeling cords 55 have a ⅜ of an inch diameter.

In order to prevent excessive lateral separation of the elastic peeling cords 55, a continuous stabilizing cord 57 is wrapped around the outside of the elastic peeling cords 55 near the middle of the length of the peeling cords 55 along a path substantially parallel to the helical flange 50. The stabilizing cord 57 is formed of ⅜ inch square neoprene or a similar rubber-like material. Plastic ties mechanically connect each elastic peeling cord 52 with the stabilizing cord 57. In another embodiment, the stabilizing cord 57 may be threaded over and under adjacent elastic peeling cords 55. This other embodiment provides more aggressive abrasion.

In another embodiment stabilizing chords 57 and peeling chords 55 may formed from a neoprene net. The applicator chute 54 provides the fruit at the first end of the flexible cable peeler 14 through the inlet 59 of the flexible cord peeler 14 to a location within the helical flange 50.

Below the flexible cable peeler 14 is a first funnel 72 and a second funnel 73. The first funnel 72 is in fluid connection with a caustic fluid recycling system. The second funnel 73 is in fluid connection with a water recycling system.

Figure 6:
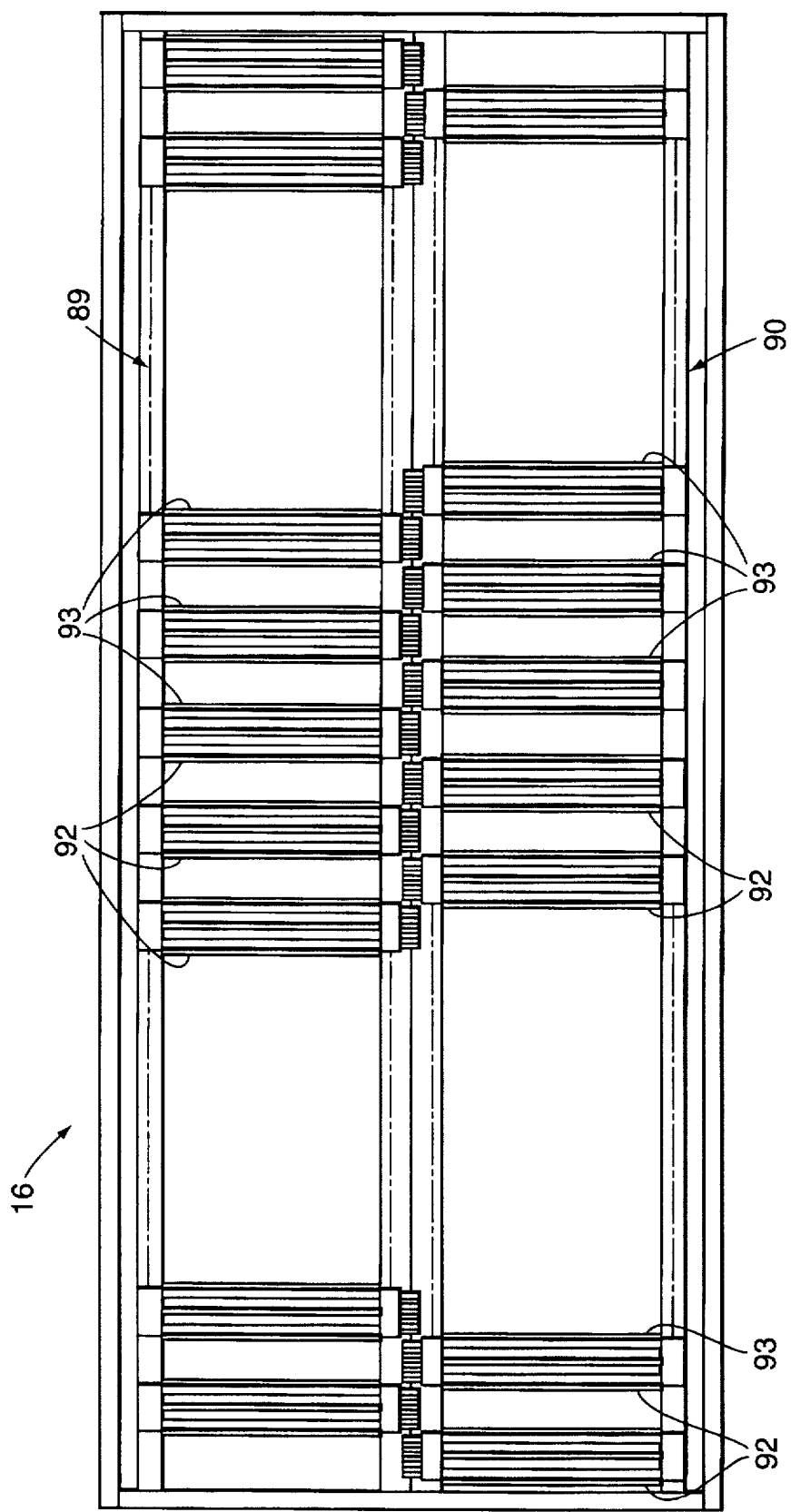
FIG. 6 is a top view of a pinch roller assembly, used in the invention.

A peeler chute 75 is located at the second end of the flexible cable peeler 14 for directing fruit from the flexible cable peeler 14 to the pinch roller assembly 16. FIG. 6 is a top view of the pinch roller assembly 16. The pinch roller assembly 16 comprises a first conveyor 89 and a second conveyor 90 wherein each conveyor is made up of a plurality of pairs of first rollers 92 and second rollers 93. In a pair of rollers the first roller 92 rotates in an opposite direction that the rotation of the second roller 93, causing a pinching between the first roller 92 and the second roller 93.

In operation, the feed conveyor 11 conveys tomatoes to the inlet 52 of the caustic applicator 12. The applicator 12 holds a caustic bath, which in this embodiment is lye, at a level shown at caustic fluid level 82. The tomatoes are caught by an upright bucket 27 above the first pulley 22.

Each bucket 27 moves from an upright position above the first pulley 22 to an upside-down position below the first pulley 22, immersing the tomatoes into a caustic bath within the housing 20. The first sleeve 77 prevents the tomatoes from leaving the buckets 27 as the buckets 27 move from an upright position to an upside-down position next to the first pulley 22. The buckets 27 remain upside-down as they pass from the first pulley 22 to the second pulley 23. The bottom of the housing 20 keeps the tomatoes from exiting the buckets 27. The buckets 27 pass under the first, second, third, and fourth row of dispensing jets 44, 45, 46, and 47 as the buckets 27 pass from the first pulley 22 to the second pulley 23. The buckets 27 then go from an upside-down position to an upright position as they pass around the second pulley 23. The second sleeve 78 keep the tomatoes from leaving the buckets 27 as they pass around the second pulley 23. The buckets 27 then pass around the third pulley 24. As the buckets 27 pass around the third pulley 24 the buckets 27 go from an upright position to an almost upside-down position, where the buckets 27 move from the third pulley 24 to the drive pulley 21. In the almost upside-down position between the third pulley 24 and the drive pulley 21, the tomatoes are allowed to fall from the buckets 27 to the applicator chute 54. The applicator chute 54 directs the tomatoes through the applicator outlet 53 to the inlet 59 of the flexible cord peeler 14.

The first heat exchanger 42 and the second heat exchanger 43 draw caustic fluid, in the preferred embodiment lye (sodium hydroxide) from the bottom of the housing 20 through pump suction boxes 79. In addition, caustic fluid is provided to the first heat exchanger 42 and the second heat exchanger 43 from pumps through caustic fluid supply lines 80. The second heat exchanger 43 allows the applicator to handle high capacities. The first and second heat exchangers 42, 43 heat the caustic fluid to a desired temperature in the preferred embodiment between 200 and 220 degrees Fahrenheit and then provide the caustic fluid through the first, second, third, and fourth row of dispensing jets 44, 45, 46, 47. The caustic fluid passes through the apertures 29 in the buckets 27 to react with the tomatoes. The caustic fluid flows through the apertures 29 and moves (stirs) the tomatoes around in the buckets 27 so that the spots where one tomato contacts another tomato or the bucket sides will get coated with caustic solution and thus prevent unpeeled spots. The increase in the number of dispensing jets and the shallower buckets 27 allows for the removal of the skins of more tomatoes, providing a higher capacity caustic applicator 12.

The drive mechanism 62 of the flexible cord peeler 14 drives the drive belt 63, which drives the drive shaft pulley 64, which drives the drive shaft 65 of the flexible cable peeler 14. The drive shaft 65 drives the longitudinally extending spokes 68, which drive the helically wound continuous tube 69, the helical flange 50, the tie rods 51, and the elastic peeling cords 52. The helically wound continuous tube 69 and the helical flange 50 move the fruit from the first end of the flexible cable peeler 14 adjacent to the caustic applicator 12 to the second end of the flexible cable peeler 14 adjacent to the pinch roller assembly 16. As the helical flange 50 rotates, the fruit rises up and moves with the rotating helical flange 50 for a distance. Then at some point, the fruit falls to the bottom of the flexible cable peeler 14, resulting in a tumbling action. The fruit causes the elastic peeling cords 55 to conform to the contour of the fruit and increases the peeling action thus removing the skin from the fruit. The skin removed from the fruit and slivers from the fruit pass between the elastic peeling cords 55 into the first funnel 72 or the second funnel 73. The first funnel 72 catches a greater amount of the caustic fluid, and so material from the first funnel 72 is directed to the caustic fluid recycling system. The second funnel 73 catches less caustic fluid and therefore may be directed to the water recycling system.

From the flexible cable peeler 14 the tomatoes pass to the peeler chute 75. The peeler chute 75 directs the tomatoes to the pinch roller assembly 16. The pinch roller assembly 16 conveys the tomatoes from the peeler chute 75. The pairs of first rollers 92 and second rollers 93 provide a pinching action to further remove any remaining skin and slivers.

The caustic applicator 12 is able to have a higher capacity, by providing an extra heat exchanger and more rows of dispensing jets, and by using shallower buckets, because the stirring action of the caustic solution through the apertures is less effective if the depth of the tomatoes in the buckets is too great. The shallower bucket allows more tomatoes per bucket with the same depth of tomatoes in the bucket and the same top width of the bucket. Thus smaller volume buckets with the same length and top width and moving at the same speed are able to handle a higher capacity of tomatoes. When the buckets are upside-down in the caustic solution, the tomatoes, being less dense than the caustic solution, are buoyed upward in the caustic solution and pressed against each other and the bottom and sides of the bucket requiring the dispensing jets and bucket apertures to stir the tomatoes as described. The higher capacity caustic applicator 12 works with the flexible cord peeler 14 which is able to also handle a higher capacity than the prior art disc scrubbers. The shallower buckets 27 have a depth 39 between 5 and 6 inches. These dimensions allow the caustic applicator 12 to be higher capacity. Thus the higher capacity caustic applicator works with the higher capacity flexible cord peeler 14 and the pinch roller assembly 16 to provide a higher capacity caustic fruit peeler system 10.

Although the best mode contemplated for carrying out the present invention has been herein shown and described, it will be understood that modification and variation may be made without departing from what is regarded to be the subject matter of the invention.

What is claimed is:

1. An apparatus for removing skin from fruit, comprising:
  a caustic applicator, comprising:
    an endless conveyor formed by a plurality of buckets, wherein each bucket has a depth wherein the depth of the bucket is not greater than 7 inches, and wherein each bucket has a bottom and a plurality of apertures in the bottom of each bucket; and a means for applying heated caustic fluid to the plurality of buckets;

a flexible cable peeler; and means for transferring the fruit from the caustic applicator to the flexible cable peeler.

2. The apparatus, as claimed in claim 1, wherein the means for applying heated caustic fluid, comprises:

a first heat exchanger; and a second heat exchanger.

3. The apparatus, as claimed in claim 1, wherein the means for applying heated caustic fluid, further comprises:

a first row of dispensing jets;

a second row of dispensing jets;

a third row of dispensing jets; and a fourth row of dispensing jets.

4. The apparatus, as claimed in claim 3, wherein the first row of dispensing jets comprises more than three dispensing jets, and wherein the second row of dispensing jets comprises more than three dispensing jets, and wherein the third row of dispensing jets comprises more than three dispensing jets, and wherein the fourth row of dispensing jets comprises more than three dispensing jets.

5. The apparatus, as claimed in claim 4, further comprising:

a pinch roller assembly adjacent to the flexible cable peeler; and a peeler chute extending between the flexible cable peeler and the pinch roller assembly.

6. The apparatus, as claimed in claim 3, wherein the second row of dispensing jets comprises more than four dispensing jets, and wherein the fourth row of dispensing jets comprises more than four dispensing jets.

7. The apparatus, as claimed in claim 6, further comprising:

a pinch roller assembly adjacent to the flexible cable peeler; and a peeler chute extending between the flexible cable peeler and the pinch roller assembly.

8. The apparatus, as claimed in claim 3, wherein the second row of dispensing jets comprises five dispensing jets, and wherein the fourth row of dispensing jets comprises five dispensing jets.

9. The apparatus, as claimed in claim 8, further comprising:

a pinch roller assembly adjacent to the flexible cable peeler; and a peeler chute extending between the flexible cable peeler and the pinch roller assembly.

10. A method for removing skin from fruit, comprising the steps of:

conveying fruit to a caustic applicator;

placing fruit in a bucket in the caustic applicator, wherein a depth of the bucket is not greater than 7 inches;

turning the bucket upside-down;

moving the bucket past at least two rows of dispensing jets; and moving the fruit from the buckets to a flexible cable peeler.

11. The method, as claimed in claim 10, further comprising the steps of:

heating a caustic fluid in a first heat exchanger;

heating the caustic fluid from a second heat exchanger;

dispensing heated caustic fluid through the first row of dispensing jet to the bucket;

dispensing heated caustic fluid through the second row of dispensing jet to the bucket;

dispensing heated caustic fluid through the third row of dispensing jet to the bucket; and dispensing heated caustic fluid through the fourth row of dispensing jet to the bucket.

12. The method, as claimed in claim 11, further comprising the step of providing a plurality of apertures greater than 0.25 inches in the bottom of the bucket.

13. The method, as claimed in claim 12, further comprising the step of passing the fruit over a pinch roller.

* * * * *